United States Patent
Douglas et al.

(10) Patent No.: US 12,373,589 B2
(45) Date of Patent: Jul. 29, 2025

(54) AUGMENTED DATA FOR SECURITY DURING RECORD UPDATES

(71) Applicant: Capital One Services, LLC, McLean, VA (US)

(72) Inventors: Lawrence Douglas, McLean, VA (US); Jeffrey Rule, Chevy Chase, MD (US); Jackson Macomber, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 234 days.

(21) Appl. No.: 18/336,861

(22) Filed: Jun. 16, 2023

(65) Prior Publication Data
US 2024/0419827 A1    Dec. 19, 2024

(51) Int. Cl.
*G06F 21/62* (2013.01)
(52) U.S. Cl.
CPC ................. *G06F 21/6218* (2013.01)
(58) Field of Classification Search
CPC .................................................. G06F 21/6218
See application file for complete search history.

(56) References Cited

U.S. PATENT DOCUMENTS

| | | | |
|---|---|---|---|
| 10,115,083 B1 * | 10/2018 | Koeppel | G06Q 20/425 |
| 2017/0046758 A1 * | 2/2017 | Sheehan | G06Q 20/10 |
| 2021/0295057 A1 * | 9/2021 | Kundu | G07F 19/207 |

* cited by examiner

Primary Examiner — Brian F Shaw
(74) Attorney, Agent, or Firm — Foley & Lardner LLP

(57) ABSTRACT

A method and related system may analyze metadata associated with a first set of transactions to determine whether to perform a second set of transactions. The method and related system may include determining a data category based on first device-provided data of a first database transaction indicating a first record associated with a second record, and may further include obtaining, based on whether the data category satisfies a first set of criteria, an identifier and an amount based on image data using a prediction model. The method may further include querying a database based on the identifier to obtain an indication that the identifier is mapped to an object category, validating the amount based on a result indicating whether the object category satisfies a second set of criteria, and causing a second transaction that changes fields of the first and second records.

20 Claims, 3 Drawing Sheets

AUGMENTED DATA FOR SECURITY DURING RECORD UPDATES

SUMMARY

Database transactions may represent interactions between different accounts. In many cases, these interactions may include transfer operations that can represent the reimbursement of funds for permitted user actions. However, such transactions may require validation before they are executed. For example, a parent account may be configured to pay only for certain expenses charged by a child account. In cases where such charges are associated with data-rich information, the categories associated with the purchases may be sufficient. However, for less data-rich transactions, the possibility of fraudulent or otherwise malicious behavior may result in the execution of transactions that should not have been executed.

Some embodiments may overcome such technical problems by using earlier-obtained, concurrently obtained, or later-obtained metadata to validate an amount of a transaction for reimbursement. Some embodiments may first determine a data richness category for device-provided data associated with a first set of database transactions that updates a dependent record of a dependent user, where the data richness category may be an established data level (e.g., Level 1 data) or a custom category. Some embodiments may then generate an indicator that identifies the first set of database transactions in response to a result indicating whether the data richness category matches a target category. In response to the indicator or some other result based on the data richness category, some embodiments may then provide a machine learning model with an obtained image to predict an object identifier and an amount associated with the object identifier. Some embodiments may then query a database with a query comprising the object identifier to retrieve a record value of an object database record, wherein the record value indicates an object category. Some embodiments may then validate the amount based on a result indicating that the object category is a category of a set of permitted object categories. After validating the amount, some embodiments may then cause a second set of database transactions that reduces a field of the source record by the amount and increases a field of the dependent record by the amount in response to the validating of the amount.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

Figure 1:
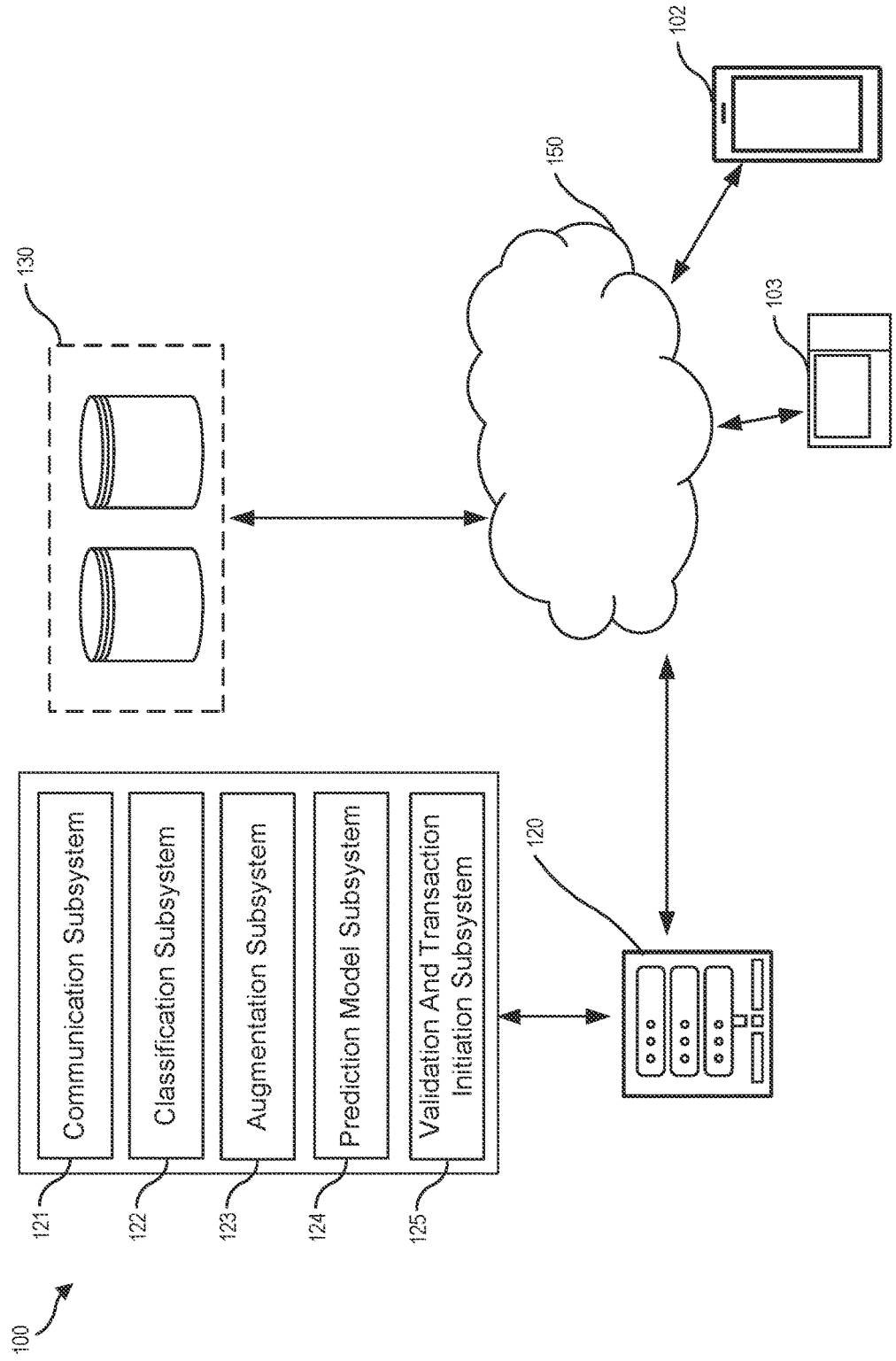
FIG. 1 depicts an example of a system for verifying an object identity with obtained images to cause transactions, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

FIG. 1 depicts an example of a system for verifying an object identity with obtained images to cause transactions, in accordance with some embodiments. The example system 100 includes a client computing device 102 used by a first user. While shown as a smartphone, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc. The system 100 may also include a payment device 103, which may provide transaction data associated with a commercial transaction that causes the initiation of a set of database transactions to effectuate the commercial transaction. The network 150 permits communication, including the sending and receiving of messages, between the client computing device 102, a set of servers 120, and a set of databases 130.

The set of servers 120 may include or have access to a set of non-transitory, computer-readable media (e.g., "storage media") storing program instructions to perform one or more operations of subsystems 121-125. The set of servers 120 may be executed as a standalone server, as a set of applications and scripts as a part of a cloud-supported set of computing operations, as a server service implemented on a cloud system, etc. It should be understood that a "server" may be implemented as a physical machine, a virtual machine, or as software that performs server services. Though the set of servers 120 is shown as a single server, some embodiments may use multiple servers to perform one or more operations. Alternatively, or additionally, some embodiments may access cloud computing services or other distributed computing services via the network 150 to perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as values identifying users, values stored in user accounts, transaction data, images, prediction model parameters, labels, etc.

In some embodiments, a communication subsystem 121 may perform communication operations to send and receive messages between the set of servers 120 and other computer devices accessible via the network 150, such as the client computing device 102 or the set of databases 130. The communication subsystem 121 may handle the transmission of data between the server and other devices or systems. This involves sending and receiving data packets, managing data buffers, and ensuring that data is transmitted accurately and efficiently. The communication subsystem 121 may also implement communication protocols used by the set of servers 120, such as HTTP, FTP, SMTP, or other custom protocols. The communication subsystem 121 may obtain data from the set of databases 130, such as prediction model parameters or other configuration values, account records, transaction records, or other information.

The communication subsystem 121 may receive device-provided data associated with a first set of database transactions. For example, the payment device 103 may provide transaction data associated with a first commercial transaction that involves a dependent user's record. The communication subsystem 121 may also receive data from the client computing device 102, such as image data (e.g., one or more images, video data, etc.) or results determined from operations performed using the image data. As described elsewhere in this disclosure, this device-provided data may be used to augment transaction data.

In some embodiments, a classification subsystem 122 may perform operations to determine a data richness category for transaction data. For example, the payment device 103 may provide data associated with a first commercial transaction that involves a dependent user's record that is then analyzed by the classification subsystem 122. The data provided by the payment device 103 may include transaction data that can be categorized with a data richness category. For example, the payment device 103 may provide Level 1 ("L1") data, Level 2 ("L2") data, or Level 3 ("L3") data. The classification subsystem 122 may then assign a data richness category to the data provided by the payment device 103. For example, the classification subsystem 122 may receive, from the payment device 103, first transaction data that includes a payment token information, card number, name, and service code, where the first transaction data does not include data types providing higher-richness data, such as billing addresses, a tax amount, or a purchase order number. In response, the classification subsystem 122 may assign "L1" as the data richness category for this data.

In some embodiments, an augmentation subsystem 123 may augment transaction data with additional data, such as image data provided by the client computing device 102, location data provided by the client computing device 102, or other data provided by the client computing device 102. Furthermore, the augmentation subsystem 123 may augment the transaction data with the results of operations performed by the client computing device 102, the set of servers 120, or other computing devices. As described in this disclosure, augmenting transaction data with additional data may include mapping, connecting, or otherwise associating the additional data with the transaction data. For example, augmenting transaction data with additional data may include storing the additional data in a record of a transaction or other data structure storing the transaction data, creating a pointer or other type of link to the additional data in the data structure storing the transaction data, creating or updating a data structure that associates a link to the data structure of the transaction data with a link to the additional data, etc. Augmenting the transaction data with additional data may result in an augmented dataset that can provide faster access to the additional data when provided with a transaction identifier.

In some embodiments, a prediction model subsystem 124 may analyze image data to determine whether the image depicts one or more permitted objects and obtain object-related data. Some embodiments may be triggered to use the prediction model subsystem 124 when the data richness category of transaction data provided by the payment device 103 is satisfied. For example, some embodiments may determine whether the transaction data provided by the payment device 103 is L1 or L2 data and, in response to a determination that the transaction data is L1 or L2 data, provide image data sent by the client computing device 102 to the prediction model subsystem 124 to obtain an object identifier or information related to the object identifier. The object identifier may include one or more various types of identifiers, such as a universal product code (UPC), a stock-keeping unit (SKU) associated with a specific entity, a custom identifier that has been assigned to an object, etc.

In some embodiments, the prediction model subsystem 124 may directly detect the presence of an alphanumeric sequence or a barcode in an image. For example, the prediction model subsystem 124 may detect the presence of a barcode storing a UPC. The prediction model subsystem 124 may then generate a character sequence representing the UPC by isolating the portion of the image containing the barcode, providing the portion of the image to a barcode reading subsystem, and using the output of the barcode reading subsystem to determine the character sequence. Some embodiments may then set the sequence representing the UPC as an object identifier.

In some embodiments, the prediction model subsystem 124 may measure object properties based on image data. For example, some embodiments may provide the prediction model subsystem 124 with an image. The prediction model subsystem 124 may then detect the presence of high-level features, identify regions of the image that may contain objects based on the detected features and propose objects within the identified regions, classify the object with an object identifier or a preliminary object category, and localize the object to a specific outline within an identified region. Some embodiments may further identify object properties such as length, width, height, color, texture, or other object features using the neural network.

In some embodiments, a validation and transaction initiation subsystem 125 may perform operations to determine an object category for an identified object and validate a transaction or portion of a transaction based on the identified object. Some embodiments may determine an object category by generating a query containing the object identifier and sending, via the communication subsystem 121, the query to the set of databases 130 to determine an object category for the object identifier. For example, some embodiments may access an object database of the set of databases 130 with a query to retrieve an object database record, where the object database record includes a record value representing an object category to which one or more object identifiers are mapped.

In some embodiments, validating a transaction or an amount of a transaction may cause an additional set of database transactions to occur, where a database transaction may include various types of updates to a database. For example, a database transaction may include operations to modify a value of a record, transfer a value from one record to another record, read a record, delete a record, delete a record value in the record, etc. For example, some embodiments may validate a transaction that involves a reduction of an amount from a first record and, in response, perform a set of database transactions that transfers, to the first record, an amount from a second record linked to the first record. The amount that is transferred is equal to the amount by which the first record was reduced. Alternatively, the amount that is validated may be less than the total amount involved in a transaction and may only be a sub-amount of the total amount. In some embodiments, validating such a sub-amount of a transaction involving a first account record may cause a set of database transactions that transfers, to the first account record, the sub-amount from a second record linked to the first record.

Figure 2:
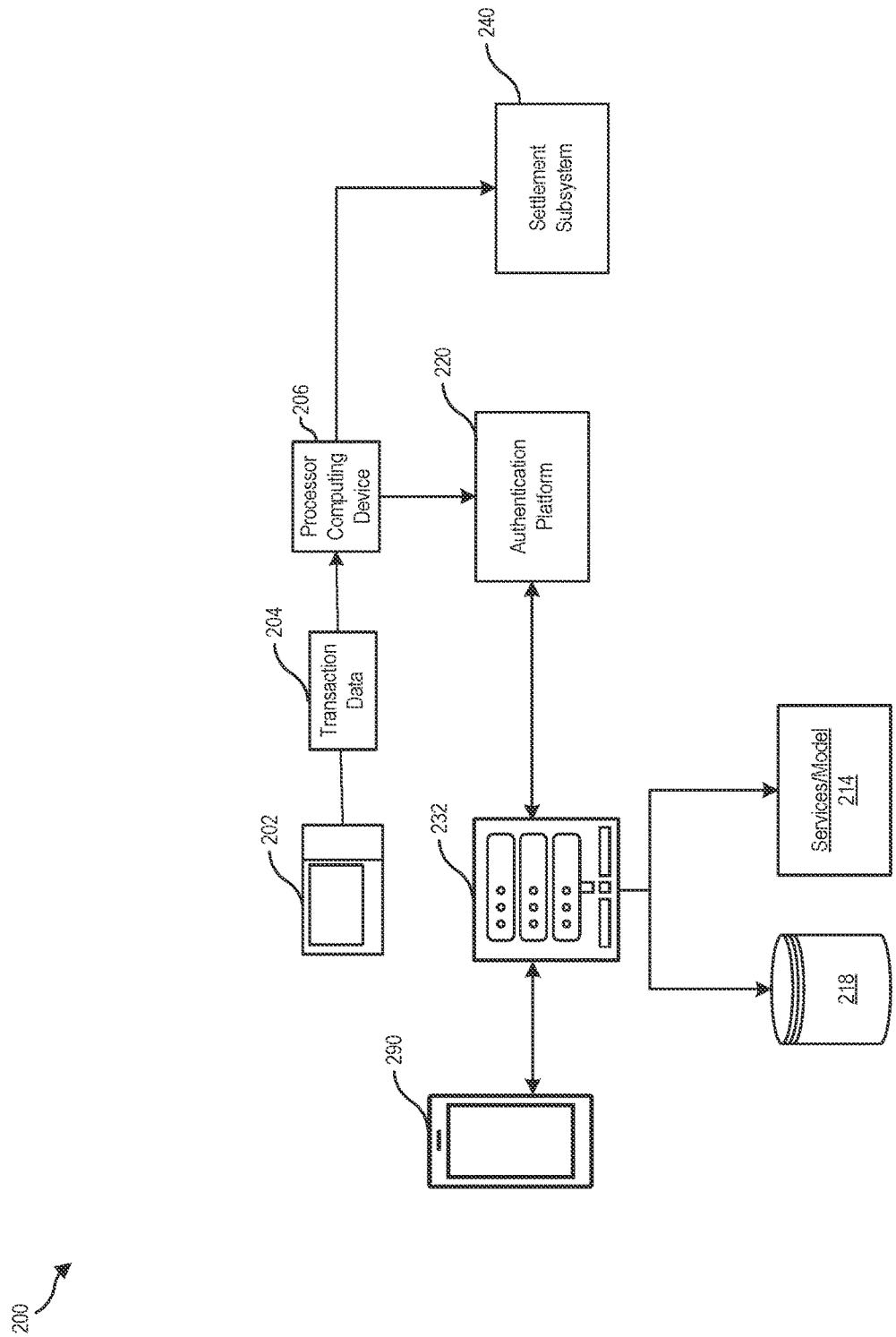
FIG. 2 depicts a diagram of a verification model to trigger additional transactions, in accordance with some embodiments.

FIG. 2 depicts a diagram of a verification model to trigger additional transactions, in accordance with some embodiments. A card reader device 202 may be used during a commercial transaction (e.g., a purchase, a return, a loan, etc.) that involves a first user account. For example, the card reader device 202 may receive information from a card that includes an account identifier of an account record stored in a computer system. The card reader device 202 may then transmit a set of transaction data 204 to a processor computing device 206. The processor computing device 206 may then send the transaction data 204 to an authentication platform 220 to execute a first set of transactions. The processor computing device 206 may also generate a settlement file that is also provided to the set of servers 232. While the set of servers 232 is depicted as a single server in FIG. 2, it should be understood that multiple servers may be used to perform one or more operations described in this disclosure.

The authentication platform 220 may be used to authenticate a user account identity. For example, the authentication platform 220 may obtain data including a card identifier, a name, and a security code. The authentication platform 220 may then authenticate this information by comparing it with a set of stored data. Once the authentication platform 220 has authenticated the information, the processor computing device 206 may generate a settlement file and send the settlement file to a settlement subsystem 240. In response to receiving the settlement file, the settlement subsystem 240 may send transaction data provided by the card reader device 202 or other the processor computing device 206 to the set of servers 232. The set of servers 232 may then perform a first set of database transactions to reflect the transaction(s) indicated by the settlement file and update a first user's record stored in the set of databases 218. For example, based on a purchase made by the first user that was made with the card reader device 202, the set of servers 232 may update the first user's account record in the set of databases 218 to reflect an update to this account.

The set of servers 232 may receive metadata such as image data, location data, audio data, or other types of data from a client computing device 290 associated with transaction data provided by a card reader device 202. The set of servers 232 may orchestrate a set of services 214 to perform a set of operations to evaluate this metadata and determine a set of object identifiers and object categories based on this metadata. Based on whether a set of criteria is satisfied by the object categories or other data, the set of servers 232 may then initiate operations to permit a second set of database operations. For example, in response to a determination that an object category determined from image data provided by the client computing device 290 is on a list of permitted object categories, the set of servers 232 may perform a second set of database operations on the set of databases 218 to transfer an amount indicated by a first transaction from a second user's account to the first user's account. Furthermore, some embodiments may configure a flag value associated with the first user's account or the second user's account in response to receiving a permitted object category or a permitted object identifier from the client computing device 290. In some embodiments, the set of servers 232 may then initiate a second set of operations in response to a detection of the flag value and receiving transaction data from the first account.

Furthermore, some embodiments may use geographical information, time information, merchant information, or other information to trigger reimbursement operations or other additional transactions. For example, some embodiments may first receive global positioning system (GPS) coordinates from the client computing device 290 indicating that a first user is in a geographical location. Some embodiments may then set a flag value associated with a first user's account such that, upon a future transaction, the transaction with the user account may result in a reimbursement operation. Furthermore, some embodiments may use a combination of different values to predict a risk score for a transaction. For example, some embodiments may provide a transaction time and a merchant category code provided by the card reader device 202 or the processor computing device 206 and object categories or identifiers predicted using image data and geographical location information provided by the client computing device 290 to a machine learning model or other prediction model executed by the set of servers 232 to determine a risk score. The set of servers 232 may then determine whether the risk score satisfies a set of services and, in response, execute the set of services.

Figure 3:
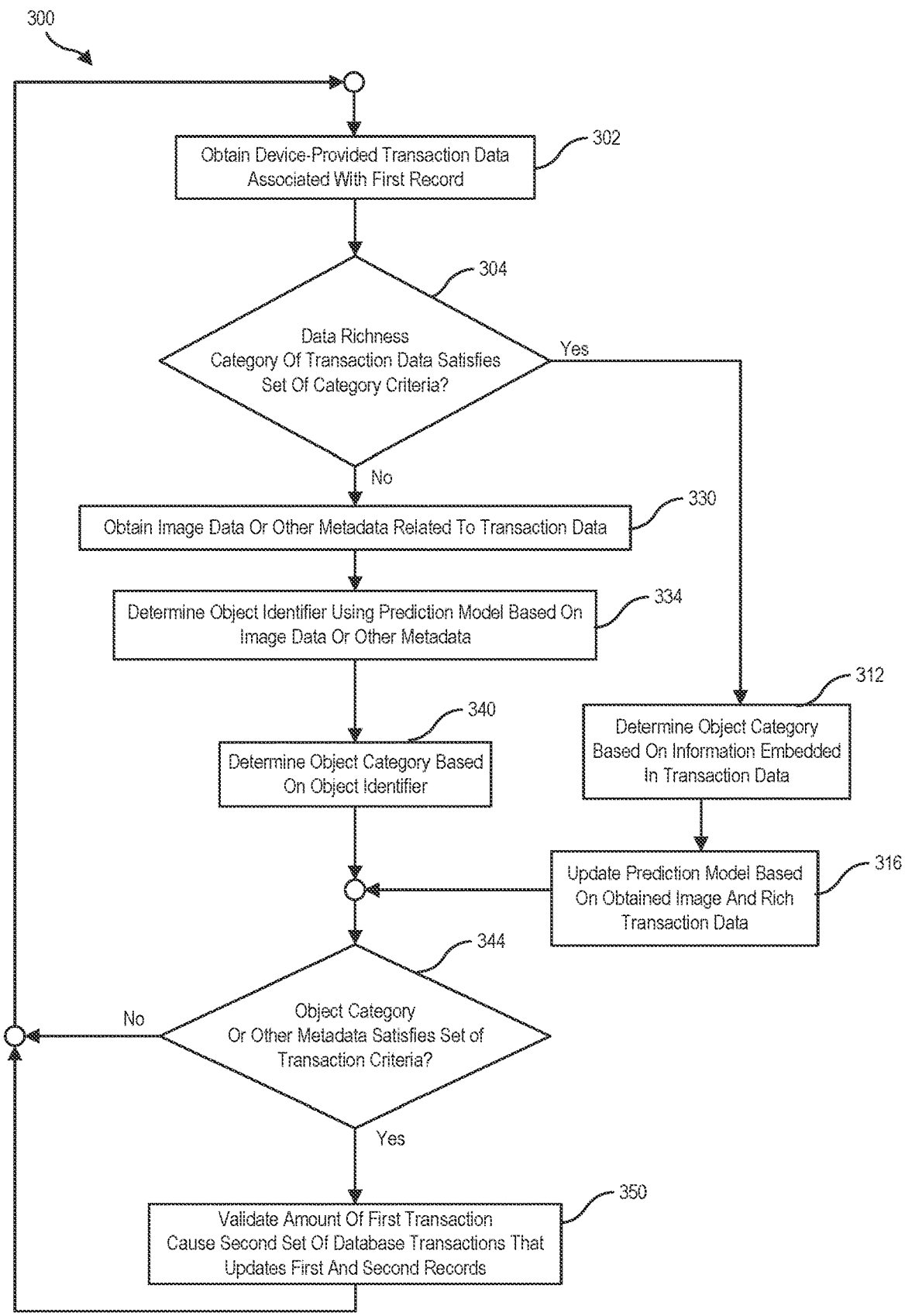
FIG. 3 shows a flowchart of a process for causing record updates based on associated object categories, in accordance with one or more embodiments.

FIG. 3 shows a flowchart of a process for causing record updates based on associated object categories, in accordance with one or more embodiments. Some embodiments may obtain device-provided transaction data associated with a first record, as indicated by block 302. Some embodiments may obtain transaction data storing various types of information associated with a commercial transaction from a device, such as a card-strip reading device, chip-reading device, or wireless signal-reading device. For example, some embodiments may receive transaction data from a card reader after a user swipes the card in the card reader, inserts a chip into the card reader, or brings a wireless antenna into the proximity of the card reader. In some embodiments, this information may include payment token information, such as generated payment token information stored on a mobile device or digital wallet. Alternatively, or additionally, some embodiments may receive data that includes payment tokens generated by a processor computing device.

The data may include different categories of data that may be categorized as L1, L2, or L3 data. The categories of data may be different data richness categories, where a data richness category for a set of transaction data may indicate a data richness of the set of transaction data. For example, the transaction data may be categorized as having only L1 transaction data, which includes an identifying account number, an expiration date, and a security code. Alternatively, or additionally, some embodiments may receive transaction data that may be categorized as having L2 transaction data, where L2 transaction data may include an order number, a tax indicator, a tax identifier, a tax amount, a requester name, a destination address, a destination city, a destination state, a destination ZIP Code, etc. Alternatively, or additionally, some embodiments may receive transaction data that may be categorized as having L3 transaction data, where the L3 transaction data may include an object identifier (e.g., a UPC or SKU), an item description, a price per unit, an extended price, a unit of measurement, a unit of cost, a commodity code, a quantity, a discount amount per line item, a total discount amount, a shipping or shipping amount, a debit or credit indicator, or other similar data with a comparable level of granular detail.

Some embodiments may determine whether a data richness category of the device-provided transaction data satisfies a set of category criteria, as indicated by block 304. Some embodiments may determine a data richness category for transaction data based on the types of information stored in the transaction data or the number of fields stored in the transaction data. For example, some embodiments may classify transaction data as "L1" transaction data based on a determination that the transaction data includes information associated with the L1 data fields and not associated with the L2 data fields (e.g., transaction data that includes an account number, an expiration date, and a security code without including an order number or tax identifier). Alternatively, or in addition, some embodiments may determine that transaction data should be labeled as L1, L2, or L3 based on the total number of fields provided by the transaction data. Furthermore, some embodiments may require both that a prerequisite number of fields be present in a respective transaction data and that the transaction data include a specified type of data associated with a data richness category before assigning the data richness category to the respective transaction data.

In some embodiments, the set of category criteria may include a criterion that the data richness category be a target category. For example, the target category may be set to "L3," and the set of category criteria may include a criterion that the data richness category for transaction data be of the target category "L3." Some embodiments may then determine that the set of category criteria is satisfied by a set of transaction data based on a determination that the set of transaction data is "L3" transaction data. Alternatively, or in addition, the set of category criteria may include other criteria such as a criterion that the transaction data include a specified field. For example, the set of category criteria may include a criterion that the transaction data include an object type identifier and, in some embodiments, may determine that transaction data having an object category satisfies the set of category criteria. In some embodiments, the object category identifier may be represented by an item product code or an item commodity code.

In response to a determination that the data richness category satisfies the set of category criteria, operations of the process 300 may proceed to operations described for block 312. Otherwise, operations of the process 300 may proceed to operations described by block 330.

Some embodiments may determine an object category based on information embedded in the transaction data, as indicated by block 312. As described elsewhere in this disclosure, higher-level transaction data may directly include an object category. For example, after receiving L3 transaction data that includes an item product code, some embodiments may then perform a search by generating an SQL query that includes the item product code to obtain an object category. The result of the search may include one or more object categories associated with the item product code and, in some embodiments, may use the resulting object category to determine whether or not to initiate a transfer transaction, as discussed elsewhere in this disclosure.

Some embodiments may update a prediction model based on obtained image data, other metadata, and the transaction data, as indicated by block 316. Some embodiments may obtain image data or other metadata while also obtaining higher-level L3 data. Some embodiments may use this information for training operations to update a prediction model. For example, some embodiments may obtain an image of an object and determine an identity of the object in the image. Some embodiments may then determine a mismatch between the identified object and the L3 data provided by a card reader device. For example, some embodiments may use a prediction model to predict the presence of a beverage at a specified price based on an image that is used as an input for a prediction model. Some embodiments may further determine that the L3 data corresponding with the purchase of the item in the image identifies an item product code that does not correspond with the L3 data.

Some embodiments may obtain image data or other metadata related to the transaction data, as indicated by block 330. The image data may be provided by a client computing device such as a smartphone, tablet device, laptop, wearable headset, or another type of computing device. The image data provided to a device may include unprocessed image data captured by a camera sensor or other image capturing device, compressed image data that has been compressed into compression formats (e.g., JPEG, PNG, or GIF), high dynamic range (HDR) image data, unprocessed video data captured by a camera, compressed video data that is stored in a compression format (e.g., MPEG, AVI, or MP4), high-definition or ultra-high-definition video data having a resolution that is at least 720p (e.g., 1080p video data, 4K video data, or 8K video data), etc. Furthermore, some embodiments may obtain multiple images or multiple video data that depict a same object or set of objects.

The image data may include a photo of an item being purchased, a photo of a location (e.g., a supermarket or kiosk), a photo of a menu or other listing of prices, a photo of a price (e.g., a pricing sticker), a photo of a store register, etc. Some embodiments may first determine a general object type based on the photo (e.g., whether the object is a list of prices or an item being purchased) or may receive such information from another computing device (e.g., from a smartphone used to provide the image data).

Furthermore, some embodiments may obtain other metadata data. Such other data may include geographical data associated with a transaction, time associated with the transaction, additional third-party data mapped to the transaction (e.g., merchant-specific information mapped to a location, third-party data mapped to elements of authorization or settlement provided by a processor, SKU or UPC data provided by the user or a third-party system, etc.), or other information associated with a transaction. For example, some embodiments may receive a geolocation coordinate from a mobile computing device in association with a transaction. The mobile computing device may use one or more methods to obtain a location, such as using a GPS, Wi-Fi triangulation, or cell tower triangulation. For example, a mobile computing device may use a GPS application to measure the time it takes for signals from satellites to reach the device, use this information to calculate the device's location, and then report this location to a server in association with a transaction.

As described elsewhere, some embodiments may obtain video data. After obtaining video data, some embodiments may use the video data to detect an object identifier. Some embodiments may determine a set of quality indicators for frames of the video data. For example, each respective quality indicator of the set of quality indicators may correspond with a respective frame of some or all of the video data, where the respective quality indicator may be determined based on a sharpness and a frame area of the respective frame. Some embodiments may then select a one or more frames based on their corresponding quality indicators (e.g., choosing a set of frames associated with one or more of the greatest quality indicators of the set of quality indicators). Some embodiments may then use the one or more maximum quality frames as part of the image data used to determine an object identifier.

Some embodiments may send a notification message to a client computing device indicating that image data for an object or other object-related data is required for operations related to database transactions affecting an account record, where the client computing device is linked to the account record. For example, some embodiments may send a notification message to a mobile computing device that causes the mobile computing device to display a request for an image of an object corresponding with a transaction. For example, some embodiments may perform a first set of database transactions to update a dependent user's account that reduces an amount stored in the dependent user's account and also updates a transaction history associated with the dependent user. Some embodiments may then determine that the transaction data associated with the update to the user's account is classified as "L1" transaction data and, in response, search for a messaging address associated with the dependent user's account. Some embodiments may then send a notification message to this messaging address that is received by a mobile computing device, where the reception of this notification message may cause the mobile computing device to display a notification in the user interface (UI) of the mobile computing device to show a request.

Though some embodiments may send a notification message to report metadata associated with a transaction, some embodiments may receive metadata first and then associate the metadata with a later transaction. For example, some embodiments may receive, from a mobile computing device, image data, location data, or other data in association with an account record identifier or other type of identifier mapped to a user identifier. Some embodiments may then configure the account to associate a next commercial transaction or a related set of database transactions with the received metadata. In some embodiments, the metadata may also include a metadata timestamp that indicates either when the metadata was obtained by the device, sent from the device, or received from the device. Some embodiments may further require that the next transaction satisfy one or more criteria, such as a criterion that the next transaction occur within a duration threshold of the received metadata. For example, some embodiments receive a set of messages that comprises image data and an identifier that maps to an account record. Some embodiments may then receive information indicating a commercial transaction identifying the account and, in response, initiate a set of database transactions. Some embodiments may then determine whether a timestamp of the commercial transaction indicates that the transaction occurs within 10 minutes of a metadata timestamp of the received image data. In response to a determination that the timestamp of the commercial transaction indicates that the transaction occurred within 10 minutes of a metadata timestamp of the received image data, some embodiments may associate the image data with the set of database transactions.

In some embodiments, third-party verification of data may provide a means of validating a transaction amount. For example, some embodiments may validate an amount used to perform a set of database transactions that updates a first user's account based on an object identifier and reimburses the first user by transferring an amount from a second user's account to the first user's account. Some embodiments may then receive later image data provided by a third user's device and receive later device-provided data of a later set of database transactions indicating a transaction involving the third user, where the first and third users' records may be unrelated to each other. Some embodiments may then determine an object identifier from this later image data by using the prediction model. Some embodiments may determine whether this later-determined object identifier matches the previous object identifier and that a set of criteria is satisfied. If a match is detected and any of the set of criteria is satisfied, some embodiments may update a configuration value associated with the first user's record that enables additional transfers from the second user's record without requiring the first user to provide additional metadata for future transactions.

The set of criteria is satisfied by the data associated with the first set of database transactions (e.g., data provided by a card reader device, image data, location data, etc.) or the later-obtained data associated with a later set of database transactions (e.g., the later image data, the later device-provided data, etc.) before updating the configuration value. For example, some embodiments may determine whether a merchant category code of transaction data for a first set of transactions matches a merchant category code of transaction data of a later device-provided data for a later transaction. The set of criteria may also include a criterion that a time threshold be satisfied, where the application of a time threshold may prevent previously provided data from becoming outdated or reflecting inaccurate information. For example, some embodiments may determine whether a time difference between a timestamp of a first set of database transactions initiated by a third party and a timestamp of a second set of database transactions initiated by a first user is within a duration threshold. The timestamp of a set of database transactions may include a timestamp indicating when later-provided metadata is provided or a timestamp indicating when a corresponding later commercial transaction occurs. The duration threshold may be greater than or equal to one minute, greater than or equal to one day, greater than or equal to three days, or some other time period.

Alternatively, or additionally, some embodiments may determine whether a set of transaction criteria is satisfied, where such transaction criteria may include a criterion that a transaction amount be less than a threshold. Some embodiments may then receive transaction information for a third transaction (e.g., another purchase by the first user), where the third transaction may involve an update to the first user's account. Some embodiments may then permit a reimbursement operation without requiring that the first user provide additional metadata based on a determination that the configuration value has been updated to permit reimbursement.

In some embodiments, later transactions may be verified for reimbursement or other actions if the corresponding transaction amount is less than a transaction amount threshold. For example, some embodiments may determine whether a future transaction having transaction data indicating that the transaction occurs at a store sharing a merchant category code as that of a previously reimbursed transaction is less than a transaction amount threshold equal to 100. The transaction amount threshold may be a numeric value representing a currency, such as an amount less than $20.00, an amount less than $40.00, an amount less than $100.00, an amount less than $500.00, etc. In response to a determination that the future transaction is less than the transaction amount threshold, some embodiments may then permit reimbursement for some or all of an amount transferred in the second transaction.

Some embodiments may determine an object identifier using a prediction model based on the image data or other metadata, as indicated by block 334. In some embodiments, the prediction used to detect and classify an object with an object identifier may include a neural network model or other machine learning model. For example, some embodiments may use a prediction model that includes a convolutional neural network (CNN) and feed an input image into the CNN. The prediction model may pass the input image through a set of convolutional layers to learn a first set of image features (e.g., edges and textures). The prediction model may then send the outputs of the set of convolutional layers to a set of pooling layers to down-sample the resulting feature maps while maintaining feature information and may repeatedly apply convolutional and pooling layers to extract more complex and abstract features (e.g., detecting a polygon, a barcode, a set of characters, etc.). The prediction model may then provide the output set of detected features to fully connected layers of the CNN to classify the image with an object identifier. In some embodiments, the prediction model may use an activation function, such as a softmax function, to assign probabilities to each class, indicating the network's confidence in its predictions. For example, a prediction model may provide, based on an image, a first object identifier "soft drink bottle" with a confidence value of "90%" corresponding with a first portion of the image and provide a second object identifier "price tag" with a confidence value of "85%" corresponding with a second portion of the image. The prediction model may provide multiple labels with the same image portion or overlapping image portion. For example, the prediction model may provide a first label "price tag" corresponding with the second portion of the image and provide a second object identifier "4.99" corresponding with the same second portion of the image.

Some embodiments may augment a data characterizing or otherwise associated with a transaction by augmenting device-provided data (e.g., data provided by a card reader device) with other types of data provided by a client computing device, such as image data, geographical data, audio data, other sensor data, etc. Some embodiments may then store the additional data in association with the device-provided data to act as an augmented dataset associated with a set of database transactions, where the set of database transactions is caused by the receiving of the device-provided data. For example, after receiving a message from a card reader device or another type of commercial transaction device involving a first account record, some embodiments may execute a set of database transactions to reduce an indicated amount stored in the first account record and L2 transaction data. Some embodiments may then receive metadata in the form of an image of a product being bought and, using an optical character recognition (OCR) method, determine an alphanumeric sequence based on the image. Some embodiments may then augment the L2 transaction data with the image and the alphanumeric sequence.

Some embodiments may maintain or delete image data or other data in a database to conserve memory based on the availability of more recent data. For example, a set of servers may perform an earlier set of database transactions and obtain first image data to associate with the earlier set of database transactions at an earlier time period. The set of servers may obtain transaction data for a later set of database transactions and perform the later set of database transactions and obtain second image data to associate with the later set of database transactions at a later time period. Some embodiments may then determine that the object identifiers corresponding with the first and second image data are the same or otherwise satisfy a matching criterion. In response to determining that the first and second images satisfy a matching criterion, some embodiments may delete the earlier-obtained image data while re-associating the earlier set of database transactions with the later-obtained image data in a data storage (e.g., storage memory of the set of servers or accessible to the set of servers).

In some embodiments, the prediction model may be trained to detect that an object is a barcode and, in response, read the barcode. For example, some embodiments may detect that a portion of an image is a barcode. Some embodiments may then transform the portion of the image (e.g., rotate, translate, rescale, etc.) surrounding the barcode, identify/interpret the barcode's symbology, and decode the signal represented by the barcode using the symbology into a character sequence (e.g., a numeric sequence, an alphanumeric sequence, etc.). Some embodiments may then use the detected character sequence as an object identifier. For example, the prediction model may detect a barcode on an item using a CNN of the prediction model and then read the barcode to determine a UPC value. Some embodiments may then use the barcode-derived UPC value as an object identifier.

In some embodiments, some of the prediction operations may be performed by a mobile computing device in a federated learning architecture. In one example of a federated architecture, a server may send model parameters to a client computing device to allow the client computing device to perform some or all of a prediction operation using a neural network or another machine learning model. After receiving the model parameters, the server may update a configuration field of the client computing device to perform one or more prediction operations. The update to the configuration field may cause the client computing device to perform various operations related to predicting an object identifier using a local version of the machine learning model. For example, a configured client computing device may obtain image data with a camera component and then provide the image data to a local version of the prediction model configured with the model parameters. Some embodiments may then provide the object identifier to the server or another computing system used to perform one or more operations described in this disclosure.

Some embodiments may receive feedback from a user indicating whether an object identifier determined by a prediction model is accurate. For example, some embodiments may receive user feedback indicating that an object identifier is inaccurate. Furthermore, some embodiments may receive multiple images of the same object and predict different object identifiers using operations described in this disclosure. Some embodiments may select a predicted object identifier as a final object identifier for use to determine an object category based on confidence values associated with the predicted object identifiers. Some embodiments may use the different predicted object identifiers to retrain a prediction model. For example, some embodiments may receive multiple images including a first image and a second image. Some embodiments may use a prediction model to predict a first object identifier and an associated first confidence value based on the first image and use the prediction model to predict a second object identifier and an associated second confidence value based on the second image. Some embodiments may then obtain and compare the confidence values and select the first object identifier in response to a determination that the first confidence value is the maximum confidence value of a set of confidence values consisting of the first and second confidence values. For example, the first confidence value is greater than or equal to the second confidence value and other confidence values of the set of confidence values. Some embodiments then send a notification to a client computing device to confirm whether a system-selected object identifier is correct. In some embodiments, a user may interact with a UI of the client computing device to confirm that the system-selected object identifier is correct. In response to receiving an indication that a system-selected object identifier is correct and that a second predicted object identifier is incorrect, some embodiments may retrain a prediction model after updating a training set for the training operation, where the updated training set may include the second image and an indication of the object identifier indicated to be correct by a user.

Some embodiments may detect multiple objects in a single image or set of images using operations described in this disclosure. For example, some embodiments may detect a beverage bottle in an image and detect a cup in the same image. Some embodiments may then use a CNN to detect object identifiers for both the beverage bottle and the cup. As described elsewhere in this disclosure, some embodiments may perform operations described in this disclosure for each of the different object identifiers to detect a set of object categories, where two or more of the set of object categories may be different from each other and where each respective object identifier is mapped to at least one object category of the set of object categories.

Some embodiments may determine an object category based on the object identifier, as indicated by block 340. Some embodiments may access a database, a knowledge graph, or another type of data structure to retrieve one or more object categories based on an object identifier. For example, some embodiments may retrieve a record from a database by using a query that includes the object identifier, where a record value of the record may be the name of an object category.

Furthermore, in some embodiments, multiple object identifiers may map to the same object category. For example, a computer system may generate a query "SELECT * FROM your_table_name WHERE name='carbonated-sugar-water-01' OR name='carbonated-sugar-water-02'" based on a first object identifier "carbonated-sugar-water-01" and a second object identifier "carbonated-sugar-water-02." The computer system may then use the query to retrieve, from a database that maps object identifiers to object categories, an object database record that includes a record value "permitted-beverage-type-01" representing an object category to which the first and second object identifiers are mapped.

In some embodiments, an object category may be represented by a code corresponding with L3 data, such as an item commodity code or item commodity code. For example, some embodiments may obtain the item commodity code for a central processing unit "20511" based on an object identifier. Some embodiments may access a database or other data store that includes a data structure that maps object identifiers to one or more object categories. For example, some embodiments may have determined the object identifier "195031206" and searched a database using a query containing this object identifier. The database may provide, in response to the query, an object category "20518" and an associated commodity code, "communication processors and protocol converters."

In some embodiments, the object category may be assigned a database-specific category name that is not shared with external systems. Alternatively, or additionally, an object category may be assigned with a known label, such as a product commodity code. Some embodiments may access an internal knowledge graph, database, or other data structure by using an object identifier to query the internal knowledge graph, database, or other data structure. Furthermore, as stated elsewhere in this disclosure, some embodiments may receive L3 transaction data that directly includes a product commodity code or another type of object category and, in response, use this transaction data-provided object category as the object category for other operations described in this disclosure, such as operations described for block 344.

Some embodiments may obtain multiple images of an object and, by analyzing the different orientations of the object or information associated with the object derived from the multiple images, obtain multiple identifiers (e.g., a UPC, SKU, custom identifier, etc.). Some embodiments may then associate these object identifiers with each other in a database or other data structure. For example, some embodiments may determine a first and second object identifier from an image, that a first object identifier is known in a database or other data structure, and that a second object identifier is not present in the database or other data structure. In response, some embodiments may add the second object identifier to the database and also associate the first and second object identifiers with each other in the database or other data structure. For example, some embodiments may assign a first object identifier "bottle-59321" representing a database-specific object identifier for an object, a second object identifier "UPC 049000007XYZ" representing a UPC for the object, and a third object identifier "102274ABC" representing an SKU for the object. Some embodiments may then determine that "bottle-59321" and "UPC 049000007XYZ" are present in a database of object identifiers and that "102274ABC" is not present in the database. Some embodiments may then add "102274ABC" to the database and associate "102274ABC" with "bottle-59321" and "UPC 049000007XYZ" in the database. In a later transaction, some embodiments may then receive an image that only permits identification of "UPC 049000007XYZ" and, in response, assign the object with the same category as the category for "102274ABC."

Some embodiments may determine whether the object category or other metadata satisfies a set of transaction criteria, as indicated by block 344. As described elsewhere in this disclosure, satisfying the set of transaction criteria may cause a system to perform an additional set of database transactions, such as a set of database transactions representing a transfer of an amount from a source record to a dependent record. In some embodiments, the set of transaction criteria may include a set of object category criteria, where determining whether an object category criterion is or is not satisfied may be based on an object category determined using operations described for block 316, block 344, or an object category determined using some other set of operations. In some embodiments, an object category may satisfy a set of object category criteria by being an object category in a set of permitted object categories. For example, some embodiments may determine that the object category "20518" is one of a set of permitted object categories that includes the object categories "205," "20516," and "20518" and thus that the object category "20518" satisfies a set of object category criteria. Alternatively, or additionally, some embodiments may determine that a candidate object category is a category in a set of prohibited object categories and may cause some embodiments to determine a set of results that indicate that the set of object category criteria is not satisfied by the candidate object category.

Some embodiments may determine whether other values associated with the set of database transactions satisfy a set of transaction criteria before performing additional record updates, such as account record updates representing a reimbursement. For example, the set of transaction criteria may include a criterion that a merchant category code be identified in a set of permitted merchant category codes, where a merchant category code may be provided by a point-of-sale device, determined using a geographical location, or provided by a user. In some embodiments, the merchant category code may represent a type of store, facility, online platform, etc. After determining that a merchant category code satisfies a set of transaction criteria by determining that the merchant category code is identified in a set of permitted merchant category codes, some embodiments may perform an additional set of database transactions representing a reimbursement operation in response. Furthermore, some embodiments may use a set of prohibited merchant category codes to determine whether transaction data or other data associated with a first set of database transactions includes a merchant category code that is identified in the set of prohibited merchant category codes. In response to a determination that the merchant category code is not identified in the set of prohibited merchant category codes, some embodiments may then perform a second set of database transactions, such as a set of database transactions representing a transfer, as described elsewhere in this disclosure.

Furthermore, some embodiments may use geographical information provided by a mobile computing device or other device to determine whether other values associated with the set of database transactions satisfy a set of transaction criteria before performing additional record updates. For example, after receiving GPS coordinates representing a geographical location from a mobile computing device, some embodiments may associate the geographical location with a transaction using one or more operations described in this disclosure. Some embodiments may then determine whether the geographical value is within a permitted geographic boundary. In response to a determination that the geographical value is within a permitted geographic region, some embodiments may perform a set of database transactions representing a reimbursement operation. The permitted geographic boundary may represent the boundary of a building, a circular region representing a radius around a previously permitted transaction, a ZIP code, a municipal area, a state, or another type of geographic boundary.

In addition, some embodiments may use a known history of price values or other values to determine whether an amount or a portion of an amount is valid. Some embodiments may, after identifying an object, retrieve previous prices associated with the object identifier. For example, some embodiments may receive an object identifier "05398" and, in response, retrieve a history of price values for the object identifier. Some embodiments may then determine a threshold range based on the history of price values. For example, some embodiments may set the maximum and minimum of the history of price values to be boundaries of the threshold range, scale the maximum or minimum of the price history by a percentage (e.g., increased by a value greater than 5%, a value greater than 10%, a value greater than 20%, etc.), and use the scaled maximum or minimum as boundaries of the threshold range, etc. Some embodiments may then determine a current price based on transaction data or metadata associated with the transaction data (e.g., image data, geographical location data, etc.). Some embodiments may then cause a second set of database transactions based on a result indicating that the current price is within the threshold range, where the second set of database transactions may represent a transfer operation, a record-flagging operation, a record-freezing operation that prevents one or more fields of a record from being updated, etc.

In response to a determination that the object category or other metadata satisfies a set of transaction criteria, operations of the process 300 may proceed to operations described for block 350. Otherwise, operations of the process 300 may wait for a new set of device-provided transaction data to be received and return to operations described for block 302 for this new set of device-provided transaction data. Alternatively, or additionally, in response to a determination that the object category or other metadata does not satisfy a set of transaction criteria, some embodiments may update a configuration value associated with the first record to prevent further updates to a selected field of the first record.

Some embodiments may validate an amount of the transaction data and cause a second set of database transactions that updates the first record and a second record, as indicated by block 350. Validating an amount of a transaction may include indicating the amount for a transfer operation or some other type of database transaction operation. Some embodiments may update some or all of the total amount involved in a first transaction. For example, some embodiments may validate the entirety of an amount used to purchase a set of items. Alternatively, some embodiments may validate a portion of the total amount. For example, some embodiments may determine that a sub-amount equal to $10 of a total amount of $30 is validated for reimbursement.

In some embodiments, the second set of database transactions may use the validated amount to update a second record that is linked to a first record, where the first record was initially updated by a first set of database transactions. For example, some embodiments may update a source and dependent record to represent a transfer of an amount from the source record to the dependent record. Such a transfer may act as a reimbursement for some or all of a set of commercial transactions (e.g., a purchase). Some embodiments may perform the second set of database transactions without generating a payment token or sending data to an authentication platform or a settlement subsystem. Alternatively, or additionally, some embodiments may send data to an authentication platform or a settlement subsystem to perform a transfer operation or another operation. For example, some embodiments may generate an additional payment token based on account information of a second record and use the payment token to cause a transfer an amount from the second record to the first record, which may be required if the first and second records are not stored in a same database or are associated with different organizations.

As described elsewhere, some embodiments may detect multiple object identifiers for different objects in an image. Furthermore, for each respective object of the multiple objects and their corresponding respective object identifier, some embodiments may then determine a corresponding object category and update an amount based on the respective object category during an additional set of database transactions if the respective category is in a set of permitted object categories. For example, some embodiments may determine a first object category "beverage" for a first object identifier derived from an image and a second object category "food" for a second object identifier derived from the image. Some embodiments may determine that both object categories are in a list of permitted object categories and, in response, validate an amount for reimbursement based on prices or another numeric value associated with the detected object categories or their associated object identifiers. After validating the amount, some embodiments may then perform a reimbursement operation or another set of database transaction operations in response to the validation of the amount.

Some embodiments may update changes to a machine learning model by incorporating information provided by richer transaction data. For example, a computer system may obtain first transaction data in the form of L1 transaction data, determining an identifier based on associated image data and determining a corresponding object category to determine whether to perform an additional set of database transactions. The computer system may then receive second transaction data indicating a same merchant identifier, where the second transaction data has a greater data richness category than the first transaction data. For example, the computer system may receive second transaction data in the form of L3 transaction data that includes an object identifier or an object category that was purchased with funds and identify information of a dependent account. Some embodiments may use the information provided by second transaction data to determine that an amount transferred in the second transaction is validated because an object category of the second transaction satisfies a set of transaction criteria. In response, some embodiments may perform another set of database transactions, such as a set of database transactions representing a reimbursement operation from a source account to the dependent account.

Some embodiments may generate a report for display, where reporting values of the report may indicate a total amount transferred, an amount transferred within a duration, sub-amounts corresponding with amounts transferred in association with a particular merchant category code, a particular object identifier, a particular object category, etc. For example, some embodiments may generate a report that includes a first reporting value representing the total amount transferred from a first account to a second account, a second reporting value representing an amount transferred within a previous two-week period, and a third reporting value representing the sub-amount transferred that corresponded with the object category for food. Some embodiments may then send the report to a client computing device, where the client computing device may display the report on a screen of the client computing device.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. The processing devices may include one or more devices configured through hardware, firmware, and/or software to be specifically designed for the execution of one or more of the operations of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real-time. It should also be noted that the systems and/or methods described above may be applied to or used in accordance with other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combination of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 121-125 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems 121-125 may provide more or less functionality than is described. For example, one or more of subsystems 121-125 may be eliminated, and some or all of its functionality may be provided by other ones of subsystems 121-125. As another example, additional subsystems may be programmed to perform some or all of the functionality attributed herein to one of subsystems 121-125 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interfaces nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already generated value.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

Enumerated Embodiments

The present techniques will be better understood with reference to the following enumerated embodiments:

1. A set of non-transitory, computer-readable media storing instructions that, when executed by one or more processors, cause the one or more processors to perform method comprising: determining a data richness category based on first device-provided data of a first set of database transactions indicating a first record, wherein the first record is associated with a second record; in response to a result indicating whether the data richness category satisfies a first set of criteria, obtaining an object identifier based on image data and model parameters of a prediction model; determining an object category based on an indication that the object identifier is mapped to the object category; validating an amount based on a result indicating whether the object category satisfies a second set of criteria; and causing a second set of database transactions that reduces a field of the second record by the amount and increases a field of the first record by the amount in response to the validating of the amount.

2. A system for increasing security by verifying object identity with obtained images, the system comprising one or more processors and a set of non-transitory, computer-readable storage media storing instructions that, when executed by the one or more processors, cause the one or more processors to perform method comprising: determining a data richness category for device-provided data associated with a first set of database transactions that updates a dependent record of a dependent user, wherein the dependent record is linked to a source record of a controlling user; generating an indicator that identifies the first set of database transactions in response to a result indicating whether the data richness category matches a target category; obtaining, in response to the indicator, an object identifier and an amount by providing an obtained image to a machine learning model to obtain the object identifier and the amount; querying a database with a query comprising the object identifier to retrieve a record value of an object database record, wherein the record value indicates an object category; validating the amount based on a result indicating that the object category is a category of a set of permitted object categories; and causing a second set of database transactions that reduces a field of the source record by the amount and increases a field of the dependent record by the amount in response to the validating of the amount.

3. A method comprising: determining a data richness category based on first device-provided data of a first set of database transactions indicating a first record, wherein the first record is associated with a second record; obtaining, based on a result indicating whether the data richness category satisfies a first set of criteria, an object identifier and an amount based on image data using a prediction model; querying a database based on the object identifier to obtain an indication that the object identifier is mapped to an object category; validating the amount based on a result indicating whether the object category satisfies a second set of criteria; and causing a second set of database transactions that reduces a field of the second record by the amount and increases a field of the first record by the amount in response to the validating of the amount.

4. The method of any of embodiments 1 to 3, wherein the image data is first image data, and wherein the first image data is provided by a first computing device, further comprising: receiving later device-provided data of a later set of database transactions indicating a third record; receiving later image data provided by a second computing device; obtaining a second object identifier by using the prediction model based on second image data; in response to a first set of results indicating that the later device-provided data shares a merchant category code with the first device-provided data, updating a configuration value associated with the first record; receiving third device-provided data of a third set of database transactions identifying the first record; and causing a fourth set of database transactions that reduces the field of the second record by a second amount and increases the field of the first record by the second amount in response to the updating of the configuration value and a result indicating that the third device-provided data comprises the merchant category code.

5. The method of embodiment 4, wherein a second set of results indicates that a time difference between a timestamp of the later set of database transactions and a timestamp of the fourth set of database transactions satisfies a duration threshold.

6. The method of any of embodiments 1 to 5, further comprising: receiving third device-provided data of a third set of database transactions identifying the first record; and causing a fourth set of database transactions that reduces the field of the second record by a second amount and increases the field of the first record by the second amount in response to a result indicating whether the second amount satisfies a transaction amount threshold.

7. The method of any of embodiments 1 to 6, further comprising sending, in response to the result indicating whether the data richness category satisfies the first set of criteria, a notification message to a computing device based on the first device-provided data that causes the computing device to display a request for an image, wherein the image data is obtained from the computing device.

8. The method of any of embodiments 1 to 7, wherein the first device-provided data comprises a merchant category code, wherein causing the second set of database transactions comprises causing the second set of database transactions based on a result indicating whether the merchant category code is identified in a set of permitted merchant category codes.

9. The method of any of embodiments 1 to 8, wherein the first device-provided data comprises a geographical location, wherein causing the second set of database transactions comprises causing the second set of database transactions based on a result indicating whether the geographical location satisfies a geographic boundary.

10. The method of any of embodiments 1 to 9, wherein: the object identifier is a first object identifier; receiving the image data comprises receiving multiple images comprising a first image and a second image from a computing device; providing the image data to the prediction model comprises: obtaining the first object identifier and a first confidence value associated with the first object identifier by providing the prediction model with the first image; obtaining a second object identifier and a second confidence value associated with the second object identifier by providing the prediction model with the second image, wherein the second object identifier is associated with a second object category; selecting the first object identifier based on a result indicating that the first confidence value is greater than the second confidence value; and the method further comprises: sending, to the computing device, a notification based on at least one of the second object category or the second object identifier; receiving, from the computing device, an indicator that the second object category is incorrect; and retraining the prediction model based on the second image in response to receiving the indicator.

11. The method of any of embodiments 1 to 10, wherein the database is a first database, wherein obtaining the object identifier comprises detecting an alphanumeric sequence presented in the image data, the method further comprising: obtaining an augmented dataset by augmenting the first device-provided data with the alphanumeric sequence; and storing, in a second database that comprises transaction data, the augmented dataset.

12. The method of any of embodiments 1 to 11, further comprising: sending the model parameters to a client computing device; and updating a configuration field of the client computing device, wherein the update to the configuration field causes the client computing device to perform method comprising: determining the object identifier by providing a local version of the prediction model configured with the model parameters with the image data; and providing the object identifier to a server, wherein obtaining the object identifier comprises obtaining, with the server, the object identifier.

13. The method of any of embodiments 1 to 12, the method further comprising: retrieving a plurality of previous prices based on the object identifier; determining a threshold range based on the plurality of previous prices; and determining a current price based on the image data, wherein causing the second set of database transactions comprises causing the second set of database transactions based on a result indicating that the current price is within the threshold range.

14. The method of any of embodiments 1 to 13, the method further comprising: obtaining video data; determining a set of quality indicators by, for each frame of a set of frames of the video data, determining a respective quality indicator; selecting a maximum quality frame based on the set of quality indicators; and determining the image data based on the maximum quality frame.

15. The method of any of embodiments 1 to 14, wherein: the object category is a first object category; the image data includes multiple objects; the object identifier is a first object identifier; obtaining the first object identifier comprises providing the image data to the prediction model to obtain a plurality of object identifiers comprising the first object identifier; each respective object identifier identifies a different object of the multiple objects; determining the first object category comprises determining a set of object categories based on a set of indications that each respective object identifier of the plurality of object identifiers is mapped to at least one category of the set of object categories, wherein validating the amount comprises validating the amount based on a set of results indicating that the set of object categories satisfies the second set of criteria.

16. The method of any of embodiments 1 to 15, the method further comprising: updating a reporting value based on the amount; and sending the reporting value to a client computing device, wherein an application executing on the client computing device presents the reporting value and on a display of the client computing device.

17. The method of embodiment 16, wherein the client computing device is a first client computing device, the method further comprising: receiving the image data from a second client computing device; and sending the image data to the first client computing device, wherein the application presents the image data.

18. The method of any of embodiments 1 to 17, wherein the image data is later-obtained image data, and wherein the object identifier is a first object identifier, the method further comprising: obtaining earlier-obtained image data associated with an earlier set of database transactions, wherein the earlier set of database transactions is indicated to occur before the first set of database transactions, wherein the earlier-obtained image data is stored in a data storage; obtaining an earlier-obtained object identifier by providing the earlier-obtained image data to the prediction model; and removing the earlier-obtained image data from the data storage based on a result indicating that the earlier-obtained object identifier matches the first object identifier.

19. The method of any of embodiments 1 to 18, wherein the data richness category is a first data richness category, the method further comprising: determining a second data richness category based on a second device-provided data of a third set of database transactions associated with the first record, wherein the second data richness category is different from the first data richness category, and wherein the second device-provided data comprises a second object identifier; determining a second object category based on the second device-provided data; validating a second amount based on a result indicating whether the second object category satisfies the second set of criteria; and causing a fourth set of database transactions that reduces the field of the second record by the second amount and increases the field of the first record by the second amount in response to the validating of the second amount.

20. The method of any of embodiments 1 to 19, wherein: the object identifier is a first object identifier; the image data is first image data; obtaining the first object identifier comprises obtaining a plurality of object identifiers comprising the first object identifier and a second object identifier, wherein the plurality of object identifiers corresponds with a same recognized object of the first image data; the method further comprising: determining whether the second object identifier is identified in a database; associating, in the database, the first object identifier with the second object identifier of the plurality of object identifiers in response to a result indicating that the first object identifier is not in the database, wherein the second object identifier is associated with the object category; receiving third transaction data of a third set of database transactions identifying the first record; obtaining the second object identifier by providing the prediction model with second image data associated with the third set of database transactions; determining the object category by searching the database to retrieve an association between the first object identifier and the second object identifier; validating a second amount based on a result indicating whether the object category associated with the third set of database transactions satisfies the second set of criteria; and causing a fourth transaction that reduces the field of the second record by the second amount associated with the third set of database transactions and increases the field of the first record by the second amount.

21. One or more tangible, non-transitory, machine-readable media storing instructions that, when executed by a set of processors, cause the set of processors to effectuate operations comprising those of any of embodiments 1 to 20.

22. A system comprising: a set of processors and memory storing computer program instructions that, when executed by the set of processors, cause the set of processors to effectuate operations comprising those of any of embodiments 1 to 20.

What is claimed is:

1. A system for increasing security by verifying object identity with obtained images, the system comprising one or more processors and a set of non-transitory, computer-readable storage media storing instructions that, when executed by the one or more processors, cause the one or more processors to perform operations comprising:
    determining a data richness category for device-provided data associated with a first set of database transactions that updates a dependent record of a dependent user, wherein the dependent record is linked to a source record of a controlling user;
    generating an indicator that identifies the first set of database transactions in response to a result indicating whether the data richness category matches a target category;
    obtaining, in response to the indicator, an object identifier and an amount by providing an obtained image to a machine learning model to obtain the object identifier and the amount;
    querying a database with a query comprising the object identifier to retrieve a record value of an object database record, wherein the record value indicates an object category;
    validating the amount based on a result indicating that the object category is a category of a set of permitted object categories; and
    causing a second set of database transactions that reduces a field of the source record by the amount and increases a field of the dependent record by the amount in response to the validating of the amount.

2. A method comprising:
    determining a data richness category based on first device-provided data of a first set of database transactions indicating a first record, wherein the first record is associated with a second record;
    obtaining, based on a result indicating whether the data richness category satisfies a first set of criteria, an object identifier and an amount based on image data using a prediction model;
    querying a database based on the object identifier to obtain an indication that the object identifier is mapped to an object category;
    validating the amount based on a result indicating whether the object category satisfies a second set of criteria; and
    causing a second set of database transactions that reduces a field of the second record by the amount and increases a field of the first record by the amount in response to the validating of the amount.

3. The method of claim 2, wherein the image data is first image data, and wherein the first image data is provided by a first computing device, further comprising:
    receiving later device-provided data of a later set of database transactions indicating a third record;
    receiving later image data provided by a second computing device;
    obtaining a second object identifier by using the prediction model based on second image data;
    in response to a first set of results indicating that the later device-provided data shares a merchant category code with the first device-provided data, updating a configuration value associated with the first record;
    receiving third device-provided data of a third set of database transactions identifying the first record; and
    causing a fourth set of database transactions that reduces the field of the second record by a second amount and increases the field of the first record by the second amount in response to the updating of the configuration value and a result indicating that the third device-provided data comprises the merchant category code.

4. The method of claim 3, wherein a second set of results indicates that a time difference between a timestamp of the later set of database transactions and a timestamp of the fourth set of database transactions satisfies a duration threshold.

5. The method of claim 2, further comprising:
    receiving third device-provided data of a third set of database transactions identifying the first record; and
    causing a fourth set of database transactions that reduces the field of the second record by a second amount and increases the field of the first record by the second amount in response to a result indicating whether the second amount satisfies a transaction amount threshold.

6. The method of claim 2, further comprising sending, in response to the result indicating whether the data richness category satisfies the first set of criteria, a notification message to a computing device based on the first device-provided data that causes the computing device to display a request for an image, wherein the image data is obtained from the computing device.

7. The method of claim 2, wherein the first device-provided data comprises a merchant category code, wherein causing the second set of database transactions comprises causing the second set of database transactions based on a result indicating whether the merchant category code is identified in a set of permitted merchant category codes.

8. The method of claim 2, wherein the first device-provided data comprises a geographical location, wherein causing the second set of database transactions comprises causing the second set of database transactions based on a result indicating whether the geographical location satisfies a geographic boundary.

9. The method of claim 2, wherein:
the object identifier is a first object identifier;
receiving the image data comprises receiving multiple images comprising a first image and a second image from a computing device;
providing the image data to the prediction model comprises:
  obtaining the first object identifier and a first confidence value associated with the first object identifier by providing the prediction model with the first image;
  obtaining a second object identifier and a second confidence value associated with the second object identifier by providing the prediction model with the second image, wherein the second object identifier is associated with a second object category;
  selecting the first object identifier based on a result indicating that the first confidence value is greater than the second confidence value; and
the method further comprises:
  sending, to the computing device, a notification based on at least one of the second object category or the second object identifier;
  receiving, from the computing device, an indicator that the second object category is incorrect; and
  retraining the prediction model based on the second image in response to receiving the indicator.

10. The method of claim 2, wherein the database is a first database, wherein obtaining the object identifier comprises detecting an alphanumeric sequence presented in the image data, the method further comprising:
obtaining an augmented dataset by augmenting the first device-provided data with the alphanumeric sequence; and
storing, in a second database that comprises transaction data, the augmented dataset.

11. A set of non-transitory, computer-readable media storing instructions that, when executed by one or more processors, cause the one or more processors to perform operations comprising:
determining a data richness category based on first device-provided data of a first set of database transactions indicating a first record, wherein the first record is associated with a second record;
in response to a result indicating whether the data richness category satisfies a first set of criteria, obtaining an object identifier based on image data and model parameters of a prediction model;
determining an object category based on an indication that the object identifier is mapped to the object category;
validating an amount based on a result indicating whether the object category satisfies a second set of criteria; and
causing a second set of database transactions that reduces a field of the second record by the amount and increases a field of the first record by the amount in response to the validating of the amount.

12. The set of non-transitory media of claim 11, further comprising:
sending the model parameters to a client computing device; and
updating a configuration field of the client computing device, wherein the update to the configuration field causes the client computing device to perform operations comprising:
  determining the object identifier by providing a local version of the prediction model configured with the model parameters with the image data; and
  providing the object identifier to a server, wherein obtaining the object identifier comprises obtaining, with the server, the object identifier.

13. The set of non-transitory media of claim 11, the operations further comprising:
retrieving a plurality of previous prices based on the object identifier;
determining a threshold range based on the plurality of previous prices; and
determining a current price based on the image data, wherein causing the second set of database transactions comprises causing the second set of database transactions based on a result indicating that the current price is within the threshold range.

14. The set of non-transitory media of claim 11, the operations further comprising:
obtaining video data;
determining a set of quality indicators by, for each frame of a set of frames of the video data, determining a respective quality indicator;
selecting a maximum quality frame based on the set of quality indicators; and
determining the image data based on the maximum quality frame.

15. The set of non-transitory media of claim 11, wherein:
the object category is a first object category;
the image data includes multiple objects;
the object identifier is a first object identifier;
obtaining the first object identifier comprises providing the image data to the prediction model to obtain a plurality of object identifiers comprising the first object identifier;
each respective object identifier identifies a different object of the multiple objects;
determining the first object category comprises determining a set of object categories based on a set of indications that each respective object identifier of the plurality of object identifiers is mapped to at least one category of the set of object categories, wherein validating the amount comprises validating the amount based on a set of results indicating that the set of object categories satisfies the second set of criteria.

16. The set of non-transitory media of claim 11, the operations further comprising:
updating a reporting value based on the amount; and
sending the reporting value to a client computing device, wherein an application executing on the client computing device presents the reporting value and on a display of the client computing device.

17. The set of non-transitory media of claim 16, wherein the client computing device is a first client computing device, the operations further comprising:

receiving the image data from a second client computing device; and sending the image data to the first client computing device, wherein the application presents the image data.

18. The set of non-transitory media of claim 11, wherein the image data is later-obtained image data, and wherein the object identifier is a first object identifier, the operations further comprising:

obtaining earlier-obtained image data associated with an earlier set of database transactions, wherein the earlier set of database transactions is indicated to occur before the first set of database transactions, wherein the earlier-obtained image data is stored in a data storage;

obtaining an earlier-obtained object identifier by providing the earlier-obtained image data to the prediction model; and removing the earlier-obtained image data from the data storage based on a result indicating that the earlier-obtained object identifier matches the first object identifier.

19. The set of non-transitory media of claim 11, wherein the data richness category is a first data richness category, the operations further comprising:

determining a second data richness category based on a second device-provided data of a third set of database transactions associated with the first record, wherein the second data richness category is different from the first data richness category, and wherein the second device-provided data comprises a second object identifier;

determining a second object category based on the second device-provided data;

validating a second amount based on a result indicating whether the second object category satisfies the second set of criteria; and causing a fourth set of database transactions that reduces the field of the second record by the second amount and increases the field of the first record by the second amount in response to the validating of the second amount.

20. The set of non-transitory media of claim 11, wherein:

the object identifier is a first object identifier;

the image data is first image data;

obtaining the first object identifier comprises obtaining a plurality of object identifiers comprising the first object identifier and a second object identifier, wherein the plurality of object identifiers corresponds with a same recognized object of the first image data;

the operations further comprising:

determining whether the second object identifier is identified in a database;

associating, in the database, the first object identifier with the second object identifier of the plurality of object identifiers in response to a result indicating that the first object identifier is not in the database, wherein the second object identifier is associated with the object category;

receiving third transaction data of a third set of database transactions identifying the first record;

obtaining the second object identifier by providing the prediction model with second image data associated with the third set of database transactions;

determining the object category by searching the database to retrieve an association between the first object identifier and the second object identifier;

validating a second amount based on a result indicating whether the object category associated with the third set of database transactions satisfies the second set of criteria; and causing a fourth transaction that reduces the field of the second record by the second amount associated with the third set of database transactions and increases the field of the first record by the second amount.

* * * * *